United States Patent [19]
Uhrhan et al.

[11] 4,145,512
[45] Mar. 20, 1979

[54] PERMANENTLY STABILIZED POLYURETHANES

[75] Inventors: Paul Uhrhan, Cologne; Harald Oertel, Odenthal; Reinhard Lantzsch, Cologne; Ernst Roos, Odenthal; Dieter Arlt, Cologne, all of Fed. Rep. of Germany

[73] Assignee: Bayer Aktiengesellschaft, Leverkusen, Fed. Rep. of Germany

[21] Appl. No.: 834,765

[22] Filed: Sep. 19, 1977

[30] Foreign Application Priority Data

Sep. 21, 1976 [DE] Fed. Rep. of Germany ....... 2642386

[51] Int. Cl.$^2$ .................... C08G 18/65; C08G 18/32; C07D 211/06
[52] U.S. Cl. ................... 528/73; 260/45.8 N; 521/164; 546/244; 546/16; 546/242; 546/221; 546/223
[58] Field of Search .................. 260/77.5 SS, 45.8 N, 260/77.5 AQ, 77.5 AM; 528/73

[56] References Cited

U.S. PATENT DOCUMENTS

| 2,702,797 | 2/1955 | Rugg | 260/45.8 N |
| 2,871,227 | 1/1959 | Walter | 260/45.8 N |
| 3,829,404 | 8/1974 | Murayama et al. | 260/77.5 SS |

*Primary Examiner*—H.S. Cockeram
*Attorney, Agent, or Firm*—Plumley and Tyner

[57] ABSTRACT

According to the invention there are obtained modified polyurethanes which have a durable, wash-fast, acid-resistant, cleaning-resistant and solvent-resistant stabilization on the basis of 2,2,6,6-tetraalkyl-piperidine light protective agents. The stabilizers are integral constituents of the polyurethanes, that is to say they are built into the polyurethane chain by a chain lengthening reaction in which two H-active reactive groups (preferably from the series of primary or secondary amino groups, carboxylic acid hydrazide, carbazic ester or semicarbazide groups) of a 2,2,6,6-tetraalkyl piperidine derivative react with isocyanate groups of polyisocyanates or isocyanate prepolymers, optionally in the presence of the usual chain lengthening agents.

4 Claims, No Drawings

PERMANENTLY STABILIZED POLYURETHANES

This invention relates to permanently stabilized polyurethanes containing derivatives of 2,2,6,6-tetraalkyl piperidines built into the polyurethane molecule as stabilizing elements.

Numerous derivatives of 2,2,6,6-tetraalkyl piperidines have recently proved to be particularly suitable for stabilizing polymers. Some representatives of this series have proved to be particularly effective in stabilizing polyurethanes, reducing both the discoloration and the degradation of strength on exposure to light (sunlight or UV light).

It was found, however, that the stabilization of polymers, and particularly of polyurethane elastomeric fibres of polyurethane coatings, rapidly loses its effect, for example when these polymers are treated with a drycleaning solvent or dyed in the (usually) slightly acidic dye baths. In the case of dyeings, moreover, pronounced disturbances in the dye absorption are observed; for example, only part of the dye becomes absorbed on the fibre in the normal manner while another part is kept in solution in the form of a "dye salt" of the basic tetraalkyl piperidine derivative and the acid groups of the dye, or a precipitate which is not resistant to abrasion may be deposited on the surface of the fibre. When polyurethane (PU) elastomeric fibres or elastomeric films which have been extracted with solvents or boild in acetic acid solutions (blind dyeing), respectively, are exposed to light, the stabilizing effect is found to have completely or almost completely disappeared.

For many purposes for which polymers are used, however, it is necessary to achieve a stabilization which is resistant to extraction, particularly if the polymers are in the form of shaped products which have a high surface/volume ratio such as filaments and fibres, as well as in the case of foils, coatings and microporous films (synthetic leather).

It is an object of the present invention to avoid the abovementioned disadvantages.

According to the invention there are obtained modified polyurethanes which have a durable, wash-fast, acid-resistant, cleaning-resistant and solvent-resistant stabilization on the basis of 2,2,6,6-tetraalkyl-piperidine light protective agents. The stabilizers are integral constituents of the polyurethanes, that is to say they are built into the polyurethane chain by a chain lengthening reaction in which two H-active reactive groups (preferably from the series of primary or secondary amino groups, carboxylic acid hydrazide, carbazic ester or semicarbazide groups) of a 2,2,6,6-tetraalkyl piperidine derivative react with isocyanate groups of polyisocyanates or isocyanate prepolymers, optionally in the presence of the usual chain lengthening agents. The extraction-resistant polyurethanes may also be obtained as polyurethane alloys of stabilizer-containing polyurethanes having a sufficiently high molecular weight and stabilizer-free polyurethanes.

The present invention thus provides permanently stabilized polyurethanes containing as part of the polyurethane chain, from 0.05% by weight to 5.0% by weight of 2,2,6,6-tetraalkyl piperidine derivatives.

The invention also provides a process for the preparation of polyurethanes which have been stabilized in a form which is resistant to extraction, characterised in that derivatives of 2,2,6,6-tetraalkyl piperidine having two H-active reactive groups are built into the polyurethane in stabilizing quantities of from 0.05 to 5% by weight, preferably from 0.1 to 2.0% by weight during the synthesis of the polyurethane from polyhydroxyl compounds, polyisocyanates and optionally chain lengthening agents.

By "permanently stabilised polyurethanes" are meant, in the context of this invention, polyurethanes from which the stabilization cannot be removed by treatment with solvents or aqueous acidic solutions.

Particularly suitable among the 2,2,6,6-tetraalkyl piperidine derivatives having two H-active reactive groups which are capable of reacting with isocyanate groups and therefore enable the said piperidine derivatives to be built into the polyurethane chains by reaction with diisocyanates or isocyanate prepolymers are those represented by the following formulae:

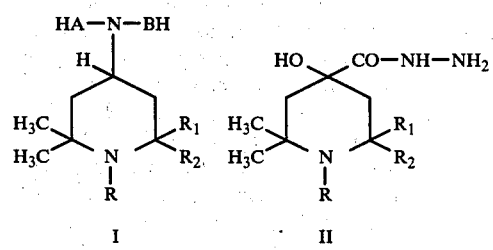

In these general formulas I and II, the symbols have the following meaning:

R represents hydrogen, straight chain or branched chain alkyl groups having from 1 to 20 C atoms, alkenyl groups having from 3 to 5 C atoms, aralkyl groups having from 7 to 12 C atoms or the group $-CH_2CHR_6-OH$ wherein $R_6$ denotes H, methyl or phenyl; $-CH_2-CH_2-CN$, $-CH_2-CH_2-COOalkyl$ or

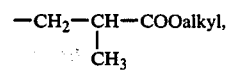

hydrogen and methyl being most particularly preferred as group R;

$R_1$ and $R_2$ which may be identical or different represent a straight chain or branched chain alkyl group having from 1 to 6 C atoms or, together with the ring C atom to which they are attached, $R_1$ and $R_2$ may represent a cycloalkyl ring having from 5 to 7 C atoms; $R_1$ and $R_2$ preferably represent methyl groups;

A represents a direct bond or ω-hydroxyalkyl, ω-aminoalkyl, ω-carboxylic acid hydrazido-, ω-semicarbazide or ω-carbazic ester groups, in each case without the end hydrogen atom; it preferably represents the groups: $-NH-(CH_2)_3-$; $-OCH_2-CH_2-$; $-O(CH(CH_3)-CH_2-$; $-HN-NH-CO-CH_2-CH_2-$; or

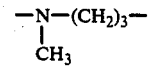

B represents ω-hydroxyalkyl, ω-aminoalkyl, ω-carboxylic acid hydrazido or ω-semicarbazido groups in each case without the terminal hydrogen atom; it preferably represents the groups:

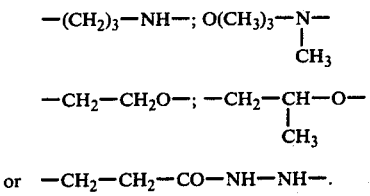

or —CH₂—CH₂—CO—NH—NH—.

According to a less preferred embodiment of the invention, there may be used compounds of formula I in which the group AH and the group R (≠ HO) are interchanged.

The H-active reactive groups of the 2,2,6,6-tetraalkyl piperidine derivatives are normally groups which are reactive with isocyanate groups, for example a (cyclo)aliphatically bound primary or secondary amino group, a carboxylic acid hydrazide, semicarbazide or carbazic ester group. These groups react very rapidly with isocyanates even at room temperature. The OH group is also a suitable reactive group. Those H-active reactive group which undergo more than 98% reaction with an aromatic isocyanate (phenyl isocyanate or diphenyl-methane-4, 4'-diisocyanate) in dimethyl formamide solution in less than 1 hour at a reaction temperature of 50° C. are generally suitable.

The preferred stabilized polyurethanes or polyurethane mixtures contain polymersegments represented by the following formula (III):

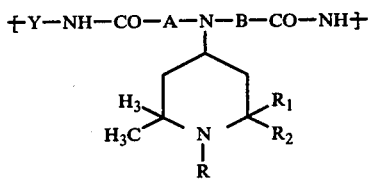

wherein Y represents the group of a diisocyanate or preferably and isocyanate prepolymer (for the structure of such prepolymers, see, for example, Belgian Patent Specification No. 734 194, German Auslegeschrift No. 1 270 276 and page 21, line 22 to page 22, line 27, below).

R, R₁, R₂, A and B have the same meanings as defined in formula I and A is preferably a direct bond or one of the following groups: —O—CH₂—CH₂—; —O—CH(CH₃)—CH₂—; —NH—(CH₂)₃—; —H-N—NH—CO—CH₂—CH₂— or

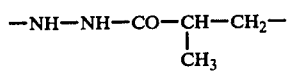

B is preferably one of the groups —CH₂—CH₂—O; —CH₂—CH(CH₃)O—; —(CH₂)₃—NH—; —CH₂—CH₂—CO—NH—NH—;

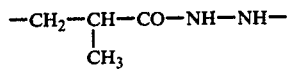

the polymer segments represented by formula III forming part of the linear chains in the polyurethanes to such an extent that the proportion of the structure represented by (IV):

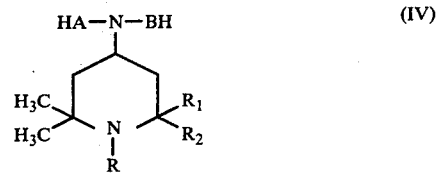

amounts to from 0.05 to 5% by weight, preferably from 0.1 to 2.2% by weight in the polyurethane or polyurethane mixture.

The quantity of reactive stabilizers, incorporated according to the invention depends generally on the nature of the polyurethane which is to be stabilized, the method employed for its synthesis and the particular purpose for which it is to be used. The quantity may vary between 0.05 and 5.0% by weight, based on the polyurethane solid content, and is preferably between 0.1 and 3.0% by weight, most preferably between 0.1 and 2.0% by weight. A particularly advantageous and economical characteristic of the reactive stabilizers is the small quantity thereof which, when incorporated, is sufficient to produce excellent and permanent stabilization; for example, this effect can be achieved with as little as 0.1 to 2.0 percent by weight. In many cases, no significant increase in the effect can be obtained by increasing the quantity beyond this range. By contrast, phenolic antioxidants, for example, require to be used in much larger quantities, e.g. from 1.5 to 2%, in order to produce sufficient stabilization (which is nevertheless inferior to the stabilization according to the invention).

The excellent protection against discoloration and degradation afforded by the incorporation of reactive stabilizer can be further increased, and widened in its scope, by the addition of UV stabilizers and/or phenolic antioxidants.

Thus, for example, polyurethanes containing approximately from 0.2 to 0.5% by weight of TAP-reactive stabilizers which have been built into the molecule in accordance with the invention may be further stabilized by the addition of about 0.5 to 1.5% by weight of phenolic stabilizers or UV absorbents (mixed in proportions of between about 1:1 and 4:1). The stabilizing effect is, however, predominantly produced by the reactive stabilizers.

The following are examples of conventional stabilizer additives:

antioxidants of the type of sterically hindered phenols, e.g. 2,6-di-tert.-butyl-p-cresol; 4,4'-thiobis-(6-tert.-butyl-3-methyl-phenol; 2,2'-thiobis-(6-tert.-butyl-4-methyl-phenol); α,α'-bis-(2-hydroxy-3,5-dialkylphenyl)-p-diisopropyl-benzenes; α,α'-bis-(2-hydroxy-3,5-dialkylphenyl)-m-diisopropyl-benzenes; 2,2'-methylene-bis-(4-methyl-6-tert.-butyl-phenol); 2,2'-methylene-bis-(4-methyl-6-cyclohexyl-phenol); 1,1,3-tris-(5-tert.-butyl-4-hydroxy 2-methyl-phenyl)-butane; tetrakis-(3,5-diteert.-butyl-4-hydroxy-phenyl-propionyloxymethyl)-methane; other compounds of divalent sulphur, e.g. dilaurylthiodipropionate; compounds of trivalent phosphorus, e.g. triphenylphospite and tris-(p-nonylphenyl)-phosphite; UV-absorbents based on 2-(2'-hydroxyphenyl)benzotriazole, e.g. 2-(2'-hydroxy-5'-methylphenyl)-benzotriazole and 2-(3',5'-di-tert.-butyl-2'-hydroxyphenyl)-5-chlorobenzotriazole; also UV absorbers based on benzophenone, e.g. 2-hydroxy-4- octoxy-benzo-phenone; 2',4'-di-tert.-butyl-phenyl-3.5-di-tert.-butyl-4-hydroxybenzoate; cyanoacrylic acid esters, e.g. α-cyano-β-methyl-β-(p-methoxyphenyl)-acrylate and other light protective agents, e.g. 2,2'-thio-bis-(4-tert.-octyl-phenolate)-n-butylamine-nickel. Other representatives are listed in German Auslegeschrift No. 2 349 962, columns 17 to 20. Improvement in dye absorption and fastness to chlorine is obtained by the addition of polymers or copolymers based on methacrylic acid esters of N,N-dialkyl-alkanols (for example, dimethylamino-ethyl-methacrylate polymers).

Whereas the quantity of reactive stabilizer which can be built into the polyurethane molecule during its synthesis is restricted in the case of tetraalkyl piperidines having only one H-reactive group, on account of their chain-breaking effect, this restriction does not apply to tetraalkyl piperidine stabilizers which have two reactive groups.

It is surprisingly found that the stabilizing properties of the tetraalkyl piperidine derivatives are not affected by the incorporation of the stabilizers in the polyurethane molecule. Even quantities below 0.5% by weight are capable of producing a stabilizing effect such as is unknown from other types of stabilizers; moreover, the stabilization is resistant to extraction and does not interfere with the absorption of acid dyes.

The stabilization according to the invention by means of tetraalkyl piperidine stabilizers which are chemically incorporated into the polyurethanes enables such stabilized polyurethanes to be extended to critical fields of application, for example in the manufacture of wrapping foils which come into contact with foodstuffs. By contrast, the low molecular tetraalkyl piperidine stabilizers which have previously been used in the form of additives in the polyurethane are easily extracted from polyurethane foils when brought into contact with dilute acids (for example, acetic acid and citric acid) or solvents and fats.

It is particularly preferred to use the reactive stabilizers in shaped products which have a relatively large surface/volume ratio, in particular fibres and filaments, foils and coatings or synthetic leather made of segmented polyurethanes. In these products, the advantages achieved by the present invention come into their full effect, for example, the resistance to extraction, the physiologically harmless fixing of the stabilizers in the polyurethane, and their stability to boiling, dyeing, washing and chemical dry cleaning. The process according to the invention is most particularly advantageous for stabilizing segmented polyurethanes, particularly if these are in the form of polyurethane elastomeric fibres. When the process is used for this purpose, it is also found very advantageous that such stabilized elastomer fibres do not lose their protection by the stabilizer in the spinning process. By contrast, it has been found that many of the usual stabilizers, such as Ionol or UV-absorbers (for example, Tinuvin ® 327 or Tinuvin 328 — Ciba-Geigy) are to a large extent lost in the process of dry spinning, in spite of their relatively high molecular weights due to sublimation with the evaporating solvent.

This advantage of the invention has already been described and will be demonstrated in some detail in the following Examples, and compared with the state of the art.

It was surprising to find that under the conditions chosen for polyurethane synthesis (reaction temperature below 100° C., use of solvents), compounds of 2,2,6,6-tetraalkyl piperidine (TAP) do not react with isocyanates on the NH group of the piperidine molecule to form the corresponding urea derivative but almost exclusively on the H-active group. It is this characteristic which ensures the stabilizing effect of 2,2,6,6-tetraalkyl piperidine, whereas $N_1$-acyl derivatives of these piperidines (for example, ureas obtained by reaction with isocyanates) have only a slight stabilizing action for polyurethanes.

$N_1$-alkyl derivatives of 2,2,6,6-tetraalkyl piperidines (I to III, R ≠ H) also have the stabilizing effect but at the same time, they are unreactive on the $N_1$—H group under the "hard" reaction conditions of isocyanate reactions carried out in polyurethane syntheses (for example, isocyanate reactions in the solvent-free melt at temperatures above 100° C., such as solvent-free polyurethane synthesis or isocyanate reactions in optionally catalysed reactive systems such as those used for the formation of foams or integral foams) and consequently retain their effect as stabilizers. It is for this reason that N-alkyl substituted tetraalkyl piperidines (I to III, R ≠ H) are preferred for use in "hard" reaction systems. Even in polyurethane reactions carried out in solvents, the N-alkyl derivatives (I to III, R ≠ H) are preferable to NH-piperidine derivatives because unwanted side reactions (trifunctional branching reaction) are at all events excluded if such N-alkyl derivatives are used.

The linear or branched polyurethanes, which may be in the form of foams or microporous foils, are produced by known processes from the usual starting materials. They are generally obtained by reacting relatively high molecular weight polyhydroxyl compounds (e.g. polyesters or polyethers having a molecular weight of about 500 to 5,000, melting points perferably below 60° C.) and aliphatic, araliphatic or aromatic polyisocyanates (preferably aromatic diisocyanates such as tolylene diisocyanate or diphenylmethane-4,4'-diisocyanate) and so called chain lengthening agents, i.e. low molecular weight compounds (molecular weight e.g. 18 to 400) having two or more isocyanate-reactive groups (e.g. water, low molecular weight diols, diamines, dihydrazides or similar compounds, such as aminoalcohols, aminohydrazides, hydroxyhydrazides, aminosemicarbazides, semicarbazidohydrazindes, hydrazine, semicarbazidocarbazie esters or mixtures of these chain lengthening agents) by a single-stage or multi-stage process carried out solvent-free or in solvents, using one of numerous known methods or modifications thereof.

The following are mentioned as examples of starting materials for polyurethane synthesis: polyesters of adipic acid and dihydric alcohols having from 2 to about 10 C atoms, preferably those having more than 5 C atoms; if desired, the dihydric alcohols may be used in the form of mixtures for the purpose of lowering the melting points of the polyesters; polyesters of caprolactone and dihydric alcohols; polyalkylene ether diols, particularly polytetramethylene ether diols, polytrimethylene ether diols, polypropylene glycol, polyethylene glycol or the corresponding copolyethers. The diisocyanates used are preferably aromatic diisocyanates, such as diphenylmethane-4,4'-diisocyanate, tolylene diisocyanate; araliphatic diisocyanates such as m-xylylene diisocyanate or aliphatic diisocyanates such as hexamethylene diisocyanate, dicyclohexyl methyl-4,4'-diisocyanate and isophorone diisocyanate. These starting materials are reacted, optionally together with additional dihydric alcohols, to produce isocyanate prepolymers which preferably have the structure indicated in Belgian Patent Specification No. 734 194. As chain lengthening agents there may be used, optionally as mixtures or in stepwise reactions, water and/or dihydric or trihydric alcohols such as butane diol and p-xylylene glycols, trimethylol propane, aminoalcohols such as ethanolamine, diamines such as diphenylmethane-4,4'-diamine; 3,3'-dichlorodiphenylmethane-4,4'-diamine; it is preferred, however, to use aliphatic diamines such as ethylene diamine; 1,2-propylene diamine; isophorone diamine; 1,3-diaminocyclohexane; meta-xylylene diamine hydrazine or dihydrazides such as carbodihydrazide; oxalic acid dihydrazide; glutaric acid dihydrazide; pimelic acid dihydrazide; terephthalic acid dihydrazide; β-alanyl-hydrazide; or semicarbazides, such as β-semicarbazidohydrazides, optionally as mixtures of chain-lengthening agents.

The incorporation of 2,2,6,6-tetraalkyl piperidine derivatives having two H-reactive groups into the polyurethanes may in principle be carried out at any stage of polyurethane formation. The reactive stabilizers may be mixed in with the polyhydroxyl compounds and then reacted with polyisocyanates and optionally other H-active chain lengthening agents (e.g. diols or diamines) to effect direct formation of the polyurethane product (e.g. preparation of polyurethane elastomers). Alternatively, the reactive stabilizers may be used as components of a foam formulation for the production of polyurethane foams, e.g. elastic soft foams semi-rigid or rigid foams or so-called integral foams or moulded parts.

These reactions to produce casting elastomers or foams generally require "hard" reaction conditions for the isocyanate reaction, that is to say, high temperatures above 100° C., which may rise to, for example, 180° C. for the formation of foams or even high (for the production of solvent-free elastomers). Reactive stabilizers I to III wherein R ≠ H are preferably used for such cases because stabilizers in which R = H are likely to react partly or completely with isocyanates on the piperidine group at high temperatures, with consequent loss of effect.

The reactive stabilizers are preferably used for the synthesis of substantially linear segmented polyurethanes which are synthesised in solvent, preferably higher polar solvents such as dimethylformamide, dimethyl acetamide or dimethyl sulphoxide, or shaped from solutions to form products such as fibres, foils or coatings.

Under the usual reaction conditions, using solvents at relatively low temperatures, which may be below about 100° C. and are usually below about 60°, the incorporation of the reactive stabilizers into the molecule can be controlled, even when compounds I or II wherein R = H are used.

When reactive stabilizers of formula I or II having an OH group as reactive group are used, these compounds are preferably incorporated at the stage of isocyanate prepolymer formation, since the reactions between the OH groups and isocyanate groups are relatively slow.

Reactive stabilizers containing the highly reactive aliphatic amino groups or hydrazide groups are preferably reacted with the isocyanate prepolymers at the stage of the chain lengthening reaction in highly polar solvents, together with the diamines or dihydrazide chain lengthening agents, or in any stepwise modification of this reaction, for example, partial or complete reaction of the chain lengthening agent, followed by addition of the reactive stabilizers, to effect reaction with the isocyanate prepolymers to form the segmented polyurethane.

The reactions may be carried out in the usual form, for example continuously or intermittenly, that is to say, with intensive mixing of the reactant, the isocyanate prepolymer (solution) and the solution of chain lengthening agent or reactive stabilizer. Stabilizers containing amino-reactive groups are preferably reacted with the isocyanate prepolymers in the form of their freshly prepared carbamate dispersions (introduction of $CO_2$ into a dimethyl formamide solution of the amine). In the chain lengthening reaction to form the segmented polyurethane, the isocyanate prepolymers are preferably used in slightly subequivalent or in equivalent quantities, based on the sum of chain-lengthening agents.

The preferred segmented polyurethanes which are obtained from the reaction of an isocyanate prepolymer, OCN—Y—NCO with a chain lengthening agent, $H_2N$—X—$NH_2$ give rise to substantially linear, segmented polyurethanes which are soluble in highly polar solvents and which may be characterised by the following formula section (V):

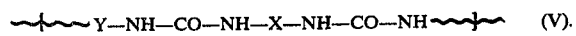 Y—NH—CO—NH—X—NH—CO—NH 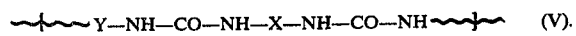    (V).

In the above formula section, Y denotes the residue of an isocyanate obtained from a relatively high molecular weight polyhydroxyl compound, preferably a dihydroxy compound having a molecular weight from 500 to 5,000 and melting points below 60° C. (e.g. the residue of a polytetramethylene ether or of a polyester) with excess molar quantities of a diisocyanate; minor quantities of low molecular weight polyols may be used in addition to the dihydroxy compound, if desired (for information on the structure of isocyanate prepolymers, see also Belgian Patent Specification No. 734 194); X denotes the residue of a divalent chain lengthening agent having $NH_2$ end groups without these $NH_2$ end groups; e.g., an aliphatic, araliphatic, aromatic or heterocyclic group, an —HN—OC-alkylene-CO—NH group, an NH—CO—NH—$(CH_2)_2$—CO—NH group or a bond between two N atoms. The synthesis of such polyurethanes or polyurethane ureas has been fully described, for example, in German Auslegeschrift No. 1,270,276 and in Belgian Patent Specification No. 734 194.

Polyurethanes which have been stabilized in accordance with the invention contain segments having the structure represented by VI or VII below, as a result of the reaction of isocyanate groups of the diisocyanates or isocyanate prepolymers with the reactive groups of the tetraalkyl piperidine derivatives:

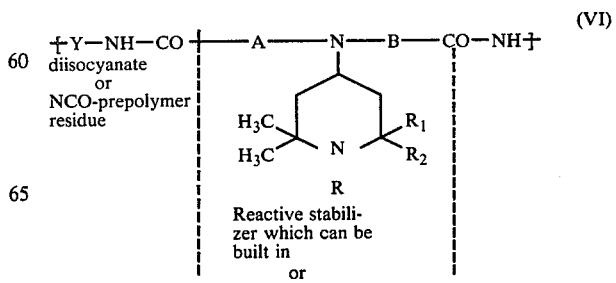

(VI)

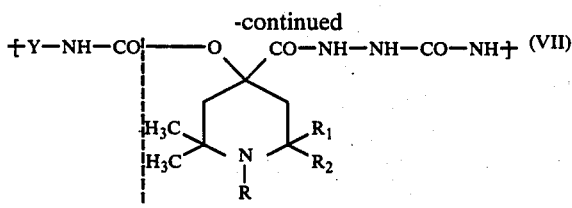

wherein R, $R_1$, $R_2$, A and B have the meanings previously indicated and Y denotes the residue of an organic diisocyanate or of an isocyanate prepolymer and the quantity of these segments corresponds to the incorporation of from 0.05 to 5 percent by weight of the tetraalkyl piperidine stabilisers having two reactive groups.

The following segment sections of polyurethanes are given as typical and preferred examples of segments of diisocyanates or of isocyanate prepolymers:

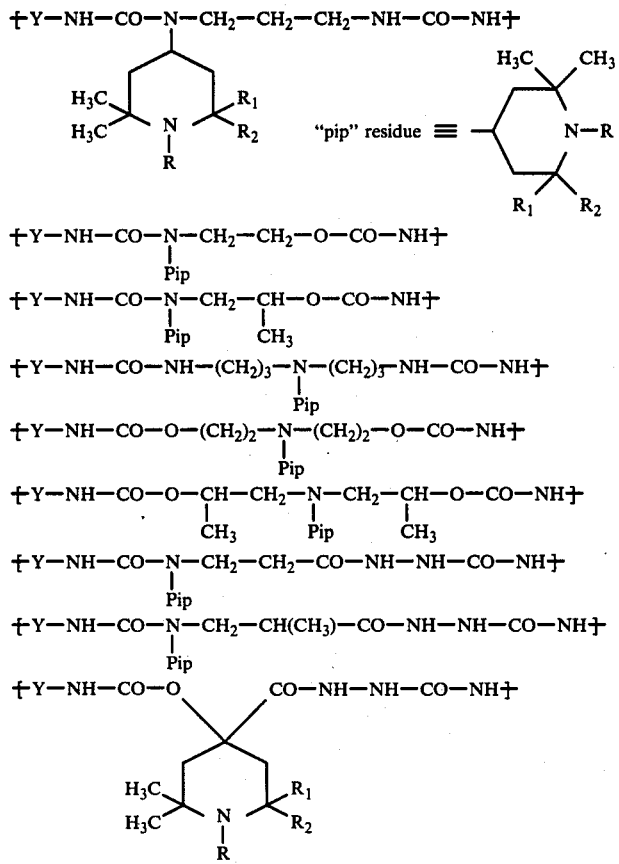

As another variation of the process, stabilization of the polyurethanes can be achieved by preparing polymer mixture of stabilizer-containing polyurethanes or polyureas with polyurethanes which are free from stabilizer, the total quantity of stabilizers of strucutures I and II built into the polyurethanes chains lying within the given limits.

Suitable stabilizer-containing polyurethanes of this kind include, for example, polymeric reaction products of diisocyanates of the isocyanate prepolymers with approximately equivalent quantities of the stabilizers which have two H-reactive groups, preferably those having the structure I or II, provided they have a sufficiently high molecular weight (for the sake of simplicity they are referred to in this application as stabilizer-containing ("polyurethanes").

The molecular weight of these stabilizer-containing polyurethanes should preferably correspond to an intrinsic viscosity ($\eta_i = \ln\eta_R/C$; $\eta_R$ = relative solution viscosity, C = concentration in g/100 ml of hexamethylphosphoramide at 25° C.) of $\geq$ 0.6, preferably $\geq$ 0.8. Products which have too low a molecular weight are liable to give rise to troublesome dye salt precipitates in dyeing processes or they may not be sufficiently resistant to extraction.

The following are examples of diisocyanates which are suitable: hexamethylene-1,6-diisocyanate; 4,4'-dicyclohexyl-methyl-4,4'-diisocyanate; isophorome diisocyanate; tolylene-2,4-diisocyanate/tolylene-2,6-diisocyanate or mixtures thereof; 4,4-diphenylmethane-4,4'-diisocyanate or 4,4'-diphenylether-diisocyanate. Aliphatic diisocyanates are preferred.

The isocyanate prepolymers used are preferably prepolymers of aliphatic, cycloaliphatic or aromatic or heterocyclic diisocyanates with low molecular weight diols (e.g. butane-1,4-diol; hexane-1,6-diol; 2,2-dimethylpentanediol; N-methyl-bis-($\beta$-hydroxy-propyl)-amine and/or particularly reaction products of the diisocyanates mentioned above with higher molecular weight dihydroxy compounds, e.g. with dihydroxypolyethers; dihydroxypolyesters; dihydroxycaprolactone esters; dihydroxypolycarbonates or other known dihydroxy compounds. The nature and chain length of the diols or of the higher molecular weight dihydroxy compounds and the OH/NCO ratio during prepolymer formation provide for the possibility of a wide variety of properties suitably adapted to the polyurethane system which is to be stabilized. Thus, for example, isocyanate prepolymers obtained from diols and diisocyanates result in relatively rigid, non-elastic polyurethanes containing stabilizer segments whereas NCO prepolymers obtained from longer chained dihydroxy compounds result in relatively soft, elastic polyurethanes with stabilizer segments.

The polyhydroxyl compounds used may be those already described above, preferably those having a low molecular weight, e.g. from 500 to 1000.

The usual diisocyanates may be used, but it is preferred to use (cyclo)aliphatic diisocyanates. The OH/NCO ratio during formation of the isocyanate prepolymer may vary from about 1:1.3 to 1:5.

If the amine components are at least partly tertiary amine components such as tertiary aminodiols (e.g. N-methyldiethanolamine, N,N'-bis-$\beta$-hydroxypropyl-piperazine) or polyesters or polyethers having built-in components containing tertiary amine (for example, incorporation by esterification of tertiary amindiols such as N-methyl-bis-($\beta$-hydroxypropyl)-amine or the use of such aminodiols as starter diols in lactone polyesters), then it is possible to build up polyurethanes which contain both the stabilizer segments according to the invention and other tertiary aminogroups in order to increase the dye absorption.

The mixing of polyurethanes which are free from stabilizers with polyurethanes containing stabilizers is preferably carried out by mixing suitable proportions of solutions of the separately prepared polyurethanes. This method is particularly preferred for segmented polyurethane solutions (for spinning or the formation of foils or coatings). The advantage of this process lies in the separate preparation of the polyurethanes, uninfluenced by each other; whatever stabilizing effect is required can then be obtained by mixing appropriate quantities of the different polyurethanes.

In the following Examples, the polyurethane solutions are generally applied in the form of their approximately 20% solutions to form layers about 0.6 to 0.8 mm in thickness on glass plates, using a doctor wiper, and then dried in the drying cupboard (about 30 min/70° C. plus about 45 min at 100° C.) After light talcum treatment, the films are stripped off.

The films are exposed to light either in the form of strips approx. 1 cm in width or in the form of filaments To produce the filaments the films are cut in a cutting machine with a set of knives to form fibres having a thickness of about 300 dtex.

The solutions may be wet spun into aqueous coagulation baths by wet spinning processes (for test purposes, for example, through a 20/0.12 mm spinning die into an 80/20 bath of water and DMF at a temperature of 80° C., draw-off rate 10 m/min) and are dried after passage through washing baths. For dry spinning, the mildly heated solution (approx. 60° C.) is extruded through nozzles into a heated spinning shaft which is additionally supplied with a direct current of hot air, the spun filaments being then drawn off at the rate of about 100 to 450 m/min. For test purposes, the filaments are spun through 16/0.2 mm nozzles, drawn from the spinning shaft at the rate of 100 m/min and wound on spools at the rate of 130 m/min after they have been dressed with talcum. The spools are heated to 130° C. for 1 hour.

For fadeometer exposure the strips of foil or the fibres are exposed in the fadeometer on cardboard supports. All the samples of an experimental group given in the Examples are placed in the exposure chamber together so that they are exposed to comparable intensities of light even if the light fluctuates.

The extraction treatments are carried out as described on foils or spun filaments lightly wound on frames. Drying is carried out at room temperature or in a water jet vacuum at 50° C.

$\eta i$-value: The molecular weight is given in terms of the $\eta i$ value. To determine this value, 1g of the polymer (calculated as pigment-free polymer) is dissolved in 100 ml of hexamethylphosphoramide (HMPA) at room temperature with shaking, the solution is filtered through a coarse glass frit, and the relative solution viscosity is measured in an Ubbelohde viscosimeter at 25° C.

$$i = \ln\eta_R/C$$

$\eta_R$ = relative solution viscosity, C = concentration in g/100 ml.

Dyeings: the filaments were heated to boiling for 1 hour with 2 percent by weight of a red acid dye (color Index No. 23 635) in 1% acetic acid solution.

All parts given in the following Examples are parts by weight unless otherwise indicated. Percentages are also percentages by weight unless otherwise indicated.

METHODS OF PREPARATION FOR THE STABILIZERS WHICH ARE TO BE INCORPORATED

1.

4-($\beta$-aminopropyl)-amino-2,2,6,6-tetramethylpiperidine (I, R = H; $R_1$ = $R_2$ = $CH_3$, AH = H, BH = $CH_2$—$CH_2$—$NH_2$)

132.5 parts of acrylonitrile were added dropwise to 156 parts of 4-amino-2,2,6,6-tetramethylpiperidine (see German Offenlegungsschrift No. 2 412 750) and the mixture was heated to 80° C. for 3½ hours. After removal of excess acrylonitrile by distillation, the residue was fractionated under vacuum. 190 parts by 4-($\beta$-cyanoethyl)-amino-2,2,6,6-tetramethylpiperidine boiling at 107°–114° C./0.04 torr were obtained.

131 parts of the product, 600 parts of methanol, 25 parts of Raney-Co and 150 parts of liquid ammonia were hydrogenated with from 80 to 100 bar $H_2$ pressure at 80° to 100° C. until hydrogen uptake ceased. 120 parts of 4-($\gamma$-aminopropyl)-amino-2,2,6,6-tetramethylpiperidine boiling at 95° C./0.1 torr were obtained after removal of the catalyst by filtration.

2.

4-bis-($\gamma$-aminopropyl)-amino-2,2,6,6-tetramethylpiperidine (I,R = H; $R_1$ = $R_2$ = $CH_3$; AH = BH = —$CH_2$—$CH_2$—$CH_2$—$NH_2$)

156 parts of 4-amino-2,2,6,6-tetramethylpiperidine are heated to boiling for 10 hours with 256 parts of acrylonitrile and 25 parts of glacial acetic acid. 185 parts of the 4-bis-($\beta$-cyanoethyl)-amino compound boiling at 175° to 185° C./0.15 torr were obtained by fractional distillation (yellowish oil, 70% yield).

80 parts of the bis-($\beta$-cyanoethyl)compound dissolved in 300 parts of methanol were hydrogenated with 15 parts of Raney cobalt and 100 parts of liquid $NH_3$ at 80° to 100° C. and a hydrogen pressure of 100 bar until uptake of $H_2$ ceased. Working up yielded 60 parts of the bis-($\gamma$-aminopropyl) compound, boiling point 130° C./0.02 torr.

3.
4-(β-hydroxyethyl)-amino-2,2,6,6-tetramethyl-piperidine (I, R = H; R₁ = R₂ = CH₃; AH = hydrogen; BH = CH₂—CH₂—OH)

156 parts of 4-amino-2,2,6,6-tetramethylpiperidine were heated to 150° C. and ethylene oxide was introduced until 44 parts thereof had been taken up. After fractional distillation, there were obtained 111 parts of 4-(β-hydroxy-ethyl)amino-2,2,6,6-tetramethylpiperidine boiling at 125° C./0.1 torr (melting point 89° to 91° C.) as well as compound 4 as higher boiling fraction.

4.
4-bis-(β-hydroxyethyl)-amino-2,2,6,6-tetramethyl-piperidine (I, R = H; R₁ = R₂ = CH₃, AH = BH = —CH₂—CH₂—OH)

Fractional distillation of (3) yielded 41 parts of the bis-hydroxyethyl compound as higher boiling constituent boiling at 160° to 165° C./0.06 torr and having a melting point of 104° C.

5.
4-(2'-hydroxy-2',2'-dimethylethyl)-amino-2,2,6,6-tetramethyl-piperidine (I, R = H; R₁ = R₂ = CH₃; AH = hydrogen;

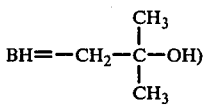

Equimolar quantities of 4-amino-2,2,6,6-tetramethylpiperidine and isobutylene oxide were boiled under reflux for 24 hours under an atmosphere of nitrogen. The reaction mixture was then left to stand at room temperature for 24 hours, and the crystals formed were separated off and recrystallised from cleaning petrol. Colourless crystals, m.pt. 78° to 80° C.

6.
4-hydroxy-2,2,6,6-tetramethyl-piperidinyl-4-carboxylic acid hydrazide (II, R₁ = R₂ = CH₃; R = H)

16.2 parts of 4-hydroxy-2,2,6,6-tetramethyl-piperidinyl-4-carboxylic acid methyl ester (according to German DRP No. 90 245) and 5 parts of hydrazine hydrate in 20 parts of methanol were heated under reflux for 10 hours. After removal of methanol by evaporation, the crystalline residue was recrystallised from cyclohexane; 15.3 parts of the hydrazide-II melting at 121° to 123° C. were obtained.

7. Triacetonamine-N,N-dihydroxyethyl-hydrazone (I, AH = BH = —CH₂—CH₂—OH)

A mixture of 68 parts of triacetonamine hydrate, 52 parts of dihydroxyethyl hydrazine and 100 parts of methanol was left to stand for two days at 25° C. and the methanol was then evaporated off. After recrystallisation from ethyl acetate, there were obtained 27 parts of triacetonamine-N,N-dihydroxyethyl-hydrazone, melting point 99° C.

8.
4-(γ-aminopropyl)-amino-1,2,2,6,6-pentamethylpiperidine (I, R = CH₃, R₁ = R₂ = CH₃, AH = H, BH = —(CH₂)₃—NH₂)

(a) 750 parts of 4-benzoylamino-1,2,2,6,6-entamethyl-piperidine were dissolved in 1,000 parts of conc. hydrochloric acid, and the solution was boiled under reflux for 10 hours. When the reaction mixture had cooled, sodium hydroxide solution was added until the reaction was alkaline, and the mixture was repeatedly extracted with methylene chloride. The residue obtained after removal of methylene chloride by evaporation was distilled under vacuum; 300 parts of 1,2,2,6,6-entamethyl-4-amino-piperidine, boiling point 98° C./15 torr, distilled over.

(b) 132.5 parts of acrylonitrile were added dropwise to 170 parts of 1,2,2,6,6-pentamethyl-4-amino-piperidine. After 3 hours' stirring at 70° C. following the addition of acrylonitrile, the reaction mixture was fractionated. 180 parts of 4-(β-cyanoethyl)-amino-1,2,2,6,6-pentamethyl-piperidine boiling at 115° to 117° C./0.08 torr were obtained.

(c) 100 parts of 4-(β-cyanoethyl)-amino-1,2,2,6,6-pentamethylpiperidine were dissolved in 500 parts of methanol and hydrogenated at a hydrogen pressure of 80 to 100 bar and a temperature of 80° to 100° C. with the addition of 150 parts of liquid ammonia and 25 parts of Raney cobalt until uptake of hydrogen ceased. The catalyst was removed by filtration and the filtrate was fractionated under vacuum. 95 parts of 4-(γ-aminopropyl)-amino-1,2,2,6,6-pentamethylpiperidine, boiling point 110° to 112° C./0.1 torr, were obtained.

$C_{13}H_{29}N_3$ (227.4) calc.: C 68.7%; H 12.7%; N 18.5%. found: C 68.7%; H 12.8%; N 18.4%.

EXAMPLE 1

(a) Isocyanate prepolymer formation 6,000 parts of polytetramethylene ether diol having a molecular weight of 2,000 (polymeg-2000 — Quaker Oats Co.), 116 parts of N-methyl-bis-(β-hydroxypropyl)-amine and 440 parts of dimethylformamide were mixed together, and a solution of 1607 parts of diphenylmethane-4,4'-diisocyanate in 1500 parts of dimethylformamide was added. After a reaction time of 40 minutes at 40° C., the isocyanate content was 2.87%, based on the solid substance.

(b) Comparison experiment: chain lengthening with ethylene diamine without built-in stabilizer 1.77 parts of ethylene diamine were dissolved in 271 parts of dimethylformamide, and 5 parts of $CO_2$ snow were added for carbamate formation. 107.5 parts of the above isocyanate prepolymer solution were introduced within a few minutes and the mixture was pigmented with 4% $TiO_2$ and diluted to a solids content of 20% with 58 parts of dimethylformamide. The freshly prepared solution had a viscosity of 88 poises (with a strong tendency to become pasty within a few hours).

Table 1 includes a comparison of the behaviour of polyurethanes containing stabilizer with polyurethanes free from stabilizer, see Table 1.

(c) Chain lengthening with 90 mol% of ethylene diamine plus 10 mol% of the stabilizer prepared according to method of preparation 1

1.59 parts of ethylene diamine and 0.63 parts of 4-(γ-aminopropyl)-amino-2,2,6,6-tetramethylpiperidine were dissolved in 271 parts of dimethylformamide. 5 Parts of $CO_2$ (snow) were added for carbamate formation and the reaction mixture was converted into the polyurethane by reaction with 107.5 parts of isocyanate prepolymer solution (a) with stirring. After pigmentation with 4% $TiO_2$ and dilution with 58 parts of dimethylformamide, there was obtained having a viscosity of 32 poises. The solution a 20% solution showed no tendency to become pasty even after several days.

The quantity of stabilizer built into the polyurethane was 0.72% by weight, based on the polyurethane solid content.

(d) Chain lengthening with 90 mol% ethylenediamine/10 mol% of the stabilizer obtained according to method of preparation 2

To 1.59 parts of ethylenediamine and 0.795 parts of 4-bis(γ-aminopropyl)-amino-2,2,6,6-tetramethylpiperidine in 271 parts of dimethylformamide there were added 5 parts of $CO_2$ (snow) for carbamate formation and the resulting mixture was reacted with 107.5 parts of isocyanate prepolymer solution (a) with vigorous stirring. After pigmentation with 4% by weight $TiO_2$ and dilution with 58 parts of dimethylformamide, a 20% elastomer solution having a viscosity of 55 poises was obtained. The solution flowed well and was stable to conversion into a paste.

The quantity of stabilizer built in corresponded to 0.90% by weight of the polyurethane solid substance.

(e) Chain lengthening with 90 mol% diamine mixture plus 10 mol% of the stabilizer prepared according to method of preparation 2

5 parts of $CO_2$ (snow) were added for the purpose of carbamate formation to 1.413 parts of ethylene diamine, 0.218 parts of 1,2-propylenediamine and 0.795 parts of 4-bis-(γ-aminopropyl)-amino-2,2,6,6-tetramethylpiperidine. The resulting mixture was reacted with 107.5 parts of isocyanate prepolymer solution (a) with vigorous stirring. After pigmentation with 4% $TiO_2$ and dilution with 58 parts of dimethylformamide, a 20% polyurethane elastomeric solution having a viscosity of 81 poises/20° C. was obtained. The elastomeric solution still flowed well after it had been left to stand for several weeks. Stabilizer content in the polyurethane 0.90% by weight.

(f) Comparison experiment with β-semicarbazido-propionic acid hydrazide-chain lengthening (without incorporation of stabilizer 4.73 parts of β-semicarbazido-propionic acid hydrazide were dissolved in 10 parts of warm water and diluted with 221 parts of dimethylformamide. 107.5 parts of isocyanate prepolymer (a) were added. The solution was pigmented with 4% $TiO_2$ and diluted to 20% with 97 parts of dimethylformamide. When left to stand, the solution (62 poises/20° C.) became pasty after 2 days. ηi-value 0.80.

(g) Chain lengthening with 90 mol% β-semicarbazido-propionic acid hydrazide plus 10 mol% stabilizer prepared according to the method of preparation 1

4.26 parts of β-semicarbazido-propionic acid hydrazide were dissolved in 9.5 parts of water and diluted with 200 parts of dimethylformamide. 66 parts of prepolymer (a) were introduced. Into this solution, which consists of relatively low molecular weight polyurethane having —CO—NH—$NH_2$ end groups were mixed 0.63 parts of 4-(γ-amino-propyl)-amino-2,2,6,6-tetramethyl-piperidine dissolved in 71 parts of dimethylformamide, and the remainder of the isocyanate prepolymer (a) (41.5 parts) was stirred in. A homogeneous solution was obtained. It was pigmented with 4% $TiO_2$ and diluted to a solid content of 20% (81 poises/20° C.) with 60 parts of dimethylformamide. ηi value = 0.81.

The quantity of built-in stabilizer in the polyurethane was 0.69%.

(h) Chain lengthening with 90 mol% β-semicarbazido-propionic acid hydrazide plus 10 mol% stabilizer prepared according to the method of preparation 2

4.26 parts of β-semicarbazido-propionic acid hydrazide were dissolved in 8.5 parts of water and diluted with 200 parts of dimethylformamide. 75 parts of isocyanate solution (a) were added with stirring. Into this solution containing hydrazide end groups were mixed 0.795 parts of 4-bis-(γ-aminopropyl)-amino-2,2,6,6-tetramethylpiperidine dissolved in 71 parts of dimethylformamide, and the remaining 32.5 parts of the isocyanate prepolymer solution (a) were stirred in. A homogeneous elastomer solution was obtained, which had a viscosity of 88 poises after pigmentation (4% $TiO_2$) and dilution with 60 parts of dimethylformamide. The quantity of stabilizer built in was 0.87% by weight. ηi value = 0.81.

(i) Chain lengthening with 90 mol% aminopropionic acid hydrazide plus 10 mol% stabilizer prepared according to the method preparation 2

2.73 parts of β-aminopropionic acid hydrazide and 0.795 parts of 4-bis-(γ-aminopropyl)-amino-2,2,6,6-tetramethylpiperidine were dissolved in 271 parts of dimethylformamide, and 107.5 parts of isocyanate prepolymer solution (a) were added to the solution. A homogeneous elastomeric solution having a viscosity of 75 poises/20° C. was obtained after pigmentation (4% $TiO_2$) and dilution with 59 parts of dimethylformamide. The stabilizer content was 0.89% by weight.

(k) Modification of an isocyanate prepolymer by incorporation of the stabilizer prepared according to method of preparation 4

100 parts of isocyanate prepolymer solution (a) were vigorously mixed with 0.67 parts of 4-bis-(β-hydroxyethyl)-amino 2,2,6,6-tetramethylpiperidine in 100 parts of dimethylacetamide and reacted for 1 hour at 40° C. To the resulting modified isocyanate prepolymer solution there was added, with stirring, the equivalent quantity of a chain lengthening mixture of ethylene diamine/1,3-diaminocyclohexane (70:30), i.e. 1.03 parts of ethylene diamine and 0.85 parts of 1,3-diaminocyclohexane in 210 parts of dimethylacetamide, and the reaction mixture was pigmented with 4% $TiO_2$. Stabilizer content in the polyurethane: 0.81% by weight.

(l) Modification of an isocyanate prepolymer solution by incorporation of the stabilizer prepared according to method of preparation 3.

0.53 parts of 4-(β-hydroxyethyl)-amino-2,2,6,6-tetramethylpiperidine in 100 ml of dimethylacetamide were introduced with vigorous stirring into a solution of 100 parts of isocyanate prepolymer solution (a) within 5 minutes with vigorous stirring. After a reaction time of 40 minutes at 40° C., there were added, with vigorous stirring, 1.83 parts of 1,2-propylenediamine in 209 parts of dimethylacetamide (as carbamate suspension after the addition of 5 parts of $CO_2$). A homogeneous elastomeric solution is obtained (80 poises/20%). The solution was pigmented with 4% $TiO_2$. The polyurethane contained 0.64% of stabilizer, built into the molecule.

(m) Chain lengthening with 90 mol% of semicarbazidopropionic acid hydrazide and 10 mol% of reactive stabilizer (see formula)

4.26 parts of β-semicarbazido-propionic acid hydrazide and 0.74 parts of stabilizer represented by the following formula:

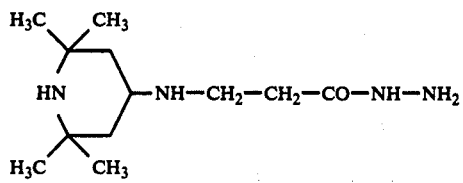

were dissolved in 8.5 parts of water, diluted with 222 parts of dimethylformamide and vigorously stirred with 107.5 parts of the above isocyanate prepolymer solution. A viscous, homogeneous elastomer solution was obtained. An approximately 20% elastomeric solution (85 poises) was obtained after pigmentation (4% $TiO_2$) and dilution with 120 parts of dimethylformamide. Stabilizer content in the polyurethane = 0.81%.

(n) Mixture of polyurethane (f) with polyurethane (h).

Equal parts of stabilizer-free polyurethane solution (f) and stabilizer-containing polyurethane solution (h) were homogeneously mixed (80 poises/20° C. - approx 0.43% by weight of reactive stabilizer built in).

The results of fadeometer exposure of foils and filaments b-n are given in the following Table 1.

Table 1

| Ex. No. | Characterisation | After-treat-ment | Without Exposure g/dtex % Elong. | After 44 hours g/dtex % Elong. | After 88 hours g/dtex % Elong. | After 110 hours g/dtex % Elong. | After 154 hours g/dtex % Elong. |
|---|---|---|---|---|---|---|---|
| Chain lengthening agent: Semicarbazidopropionic acid hydrazide | | | | | | | |
| 1-f | Comparison Without incorporation of stabilizer | none "Per" | 0.46  780 colourless colourless | 0.33  700 yellow 0.25  500 yellow | yellow brown No longer measurable | No longer measurable - No strength in thread | |
| 1-g | 0.60% stabilizer incorporated according to MP-1 (method of preparation = MP) | none "Per" | 0.46  700 colourless colourless | 0.42  700 colourless 0.46  740 colourless | 0.45  720 colourless 0.46  730 colourless | 0.42  695 colourless 0.42  660 colourless | 0.41  680 colourless 0.39  640 colourless |
| 1-h | 0.87% stabilizer according to MP-2 | none "Per" | 0.43  740 colourless colourless | 0.49  740 colourless 0.44  695 colourless | 0.44  710 colourless 0.42  695 colourless | 0.44  700 colourless 0.41  695 colourless | 0.39  640 colourless 0.41  695 colourless |
| 1-n | Mixture 1:1 1-f + 1-h | none | colourless ← | colourless tensile strength unchanged | colourless | colourless → | colourless slight reduction in tensile strength |
| 1-m | 0.81% incorporation of | none | colourless ← | colourless | colourless tensile strength unchanged | colourless | colourless → |

These results of discoloration and measurement of tensile strength and exposure show exceptionally good stabilization, tensile strengths being virtually fully maintained even after 154 Fadeometer hours. The temporary increase in strengths could be due to very slight cross-linking since the tension of the threads at 300% elongation also rises slightly (about 5 to 10% increase). The stabilizing effect is completely resistant to perchloroethylene treatment and is virtually preserved. By contrast, the stabilizer effect obtained from the addition of stabilizers such as Tinuvin 770 is completely destroyed after perchloroethylene extraction.
The fibres according to Example 1-f/1-g and 1-h can be dyed abrasion-fast with 2% Acid Red 114, the dye absorption of 1-g and 1-h being higher than that of comparison sample 1-f.
When the elastomer solutions 1-f/1-g/1-h are spun by the wet spinning process, the thermal properties of the filaments obtained are practically identical. The heat distortion temperature (see Belgian Patent Specification) of 1-f = 188° C; 1-g = 187° C; 1-h = 186° C.

Chain lengthening agent: diamine

| | | | | | | | |
|---|---|---|---|---|---|---|---|
| 1-b | Comparison sample without stabilizer | none "Per" | colourless colourless | yellow, strength completely broken down after only 22 hours severely discoloured and degraded | yellow brown, decomposing foil yellow brown, decomposing foil | — — | — — |
| 1-c | 0.72% stabilizer incorporated according to MP-1 | none "Per" | colourless ← colourless ← | colourless tensile strength unchanged colourless tensile strength of filaments as without per extraction | colourless colourless | colourless colourless | colourless tensile strength slightly reduced colourless → |
| 1-d | 0.90% stabilizer incorporated according to MP-2 | none "Per" | colourless ← colourless ← | colourless tensile strength unchanged colourless tensile strength of filaments as without per extraction | colourless colourless | colourless colourless | colourless tensile strength slightly reduced colourless |

1-e 0.90% MP-2 (results as in Example 1-d)
1-k 0.81% MP-4 (result as in Example 1-d)
PU elatomers which have been chain lengthened with diamines are slightly more sensitive to degradation by light than PU elastomers chain lengthened with hydrazide, due to their structure. Nevertheless, here again the incorporation of stabilizer produces an excellent and extraction resistant stabilizing effect.

Chain lengthening agent: β-Aminopropionic acid hydrazide

| | | | | | | | |
|---|---|---|---|---|---|---|---|
| 1-i | 0.89% stabilizer incorporated according to MP-2 | none "Per" | colourless ← colourless ← | colourless colourless tensile strength practically unchanged | colourless colourless | colourless colourless | colourless → colourless tensile strength |

Table 1-continued

| | | Fadeometer exposure of polyurethane elastomer foils or cut threads | | | | | | | | | |
|---|---|---|---|---|---|---|---|---|---|---|---|
| | After- | Discoloration tensile strength (g/den) or elongation at break (%) after Fadeometer exposure | | | | | | | | | |
| Ex. | treat- | Without Exposure | | After 44 hours | | After 88 hours | | After 110 hours | | After 154 hours | |
| No. | Characterisation | ment- | g/dtex | % Elong. | g/dtex | % Elong. | g/dtex | % Elong. | g/dtex | % Elong. | g/dtex | % Elong. |
| | | | | | | | | | | | slightly reduced |

"Per" Extraction treatment with perchloroethylene at 50° C. for one hour

EXAMPLE 2

Formation of isocyanate prepolymer 1200 parts of polytetramethylene ether diol (mol.wt.2000), 23.2 parts of N-methyl-bis-($\beta$-hydroxypropyl)-amine, 321.4 parts of diphenyl-methane-4,4'-diisocyanate and 386 parts of dimethylformamide were reacted together at 40° C. for 40 minutes to produce the isocyanate prepolymer having an isocyanate content of 2.87% (based on the solid substance).

(A) Chain lengthening with ethylenediamine (Comparison experiment)

4.54 parts of ethylene diamine, 539 parts of dimethylformamide and 10 parts of carbon dioxide snow were reacted with 215 parts of isocyanate prepolymer. A homogeneous elastomeric solution having a viscosity of 155 poises was obtained after pigmentation (4% $TiO_2$, based on solid substance). $\eta i = 0.97$.

(B) Incorporation of 10 mol% of 4-($\beta$-hydroxyethyl)-amino-2,2,6,6-tetramethylpiperidine 5.88 parts of 4-($\beta$-hydroxyethyl)-amino-2,2,6,6-tetramethylpiperidine in 700 parts of dimethylformamide were reacted with 1075 parts of isocyanate prepolymer solution, and, after 30 minutes at room temperature, the resulting isocyanate-containing solution was sitrred into a suspension of 15.88 parts of ethylenediamine/30 parts of carbon dioxide in 200 parts of dimethylformamide. A viscous, homogeneous elastomeric solution which was resistant to conversion into a paste and had a viscosity of 50 poises were obtained (0.67% by weight of stabilizer built into the polymer). The elastomeric solution was pigmented with 4% by weight of $TiO_2$(rutile), based on the solid elastomeric substance.

(C) Incorporation of 10 mol% of 4-bis-($\beta$-hydroxyethyl)-amino-2,2,6,6-tetramethylpiperidine 7.17 parts of 4-bis-($\beta$-hydroxyethyl)-amino-2,2,6,6-tetramethylpiperidine (see method of preparation 4), 15.9 parts of ethylenediamine and 2700 parts of dimethylformamide were stirred with 30 parts of carbon dioxide snow and then with 1075 parts of isocyanate prepolymer solution. A clear, homogeneous solution which was resistant to conversion into a paste was obtained. After pigmentation with 4% $TiO_2$, the solution had a viscosity of 375 poises. $\eta i$-value = 0.96 (0.81% by weight of stabilizer built into the polymer).

(D) Incorporation of 5 mol% of 4-bis-($\gamma$-aminopropyl)-amino-2,2,6,6-tetramethylpiperidine 3.98 parts of 4-bis-($\gamma$-aminopropyl)-amino-2,2,6,6-tetramethyl-piperidine (see method of preparation 2), 16.75 parts of ethylenediamine and 2700 parts of dimethylformamide were reacted with 30 parts of carbon dioxide snow and then with 1075 parts of isocyanate prepolymer.

The viscous (235 poises), homogeneous solution obtained, which was resistant to conversion into a paste, was pigmented with 4% $TiO_2$. (0.45% by weight Stabilizer built into the polymer). For results, see Table 2.

Table 2

| | | | Fadeometer exposure of polyurethane elastomer foils and filaments | | | | | | | | | |
|---|---|---|---|---|---|---|---|---|---|---|---|---|
| | | After- | Discoloration, tensile strength (g/dtex) and elongation at break (%) after Fadeometer exposure | | | | | | | | | |
| Ex. | | treat- | Without exposure | | After 22 hours | | After 44 hours | | After 66 hours | | After 88 hours | |
| No. | Characterisation | ment | g/dtex | % Elong. | g/dtex | % Elong. | g/dtex | % Elong. | g/dtex | % Elong. | g/dtex | % Elong. |
| 2 A | Ethylene diamine chain lengthening Without stabilizer | none — | 0.47 colourless | 685 | ← yellow | | No longer measurable, completely destroyed intense yellow → yellow brown | | | | | → |
| 2 B | 0.67 stabilizer incorporated according to MP 3 | none "Per" (see Table 1) | 0.37 colourless 0.38 colourless | 880 860 | 0.28 yellowish 0.25 yellowish | 610 660 | 0.22 yellowish 0.20 yellow | 570 520 | 0.15 yellow 0.12 yellow | 350 360 | 0.11 yellow 0.09 yellow | 290 270 |
| 2 C | 0.81% stabilizer according to MP 4 | none "Per" | 0.55 colourless 0.53 colourless | 700 730 | 0.42 almost colourless 0.40 almost colourless | 660 670 | 0.35 yellowish 0.33 yellowish | 600 590 | — not measured — | | 0.15 yellow 0.11 yellow | |
| 2 D | Was not measured | | colourless | | almost colourless | | yellow | | yellow | | yellow | |

The relatively sensitive elastomer solution chain lengthened with diamine is well stabilized. Its stabilization is sufficiently resistant to extraction; the effect of these stabilizers is slightly weaker than in Example 1.

EXAMPLE 3

(A) Chain lengthening with semicarbazido-propionic acid hydrazide (Comparison experiment without stabilizer)

8.63 parts of $\beta$-semicarbazido-propionic acid hydrazide dissolved in 17 parts of water and 450 parts of dimethylformamide were reacted with 215 parts of isocyanate prepolymer (prepared as in Example 2, isocyanate content 2.62% in the solid substance), and 210 parts of dimethylformamide and 4% TiO$_2$ were added. The elastomeric solution had a viscosity of 640 poises. ηi- value 1.15.

(B) Incorporation of 10 mol% of 4-(β-hydroxyethyl)-amino-2,2,6,6-tetramethyl-piperidine 1075 parts of isocyanate prepolymer were added to 5.36 parts of 4-(β-hydroxyethyl)-amino-2,2,6,6-tetramethylpiperidine in 1120 parts of dimethylformamide and, after a reaction time of 10 minutes at 50° C., the reaction mixture was introduced into a solution of 38.8 parts of β-semicarbazidopropionic acid hydrazide in 77 parts of water and 2,000 parts of dimethylformamide. The clear, homogeneous elastomeric solution obtained was pigmented with 4% TiO$_2$ (based on solid substance). It then had a viscosity of 170 poises/20.6% ηi = 0.94. (0.6% by weight stabilizer built into the polymer).

(C) Incorporation of 10 mol of 4-bis-(β-hydroxyethyl)-amino-2,2,6,6-tetramethyl-piperidine 6.54 parts of 4-bis-(β-hydroxyethyl)-amino-2,2,6,6-tetramethylpiperidine in 1180 parts of dimethylformamide were reacted with 1075 parts of an isocyanate prepolymer solution (2.62% NCO) and reacted with a solution of 38.8 parts of β-semicarbazido-propionic acid hydrazide in 2,000 parts of dimethylformamide for the equivalent isocyanate reaction. After pigmentation with 4% TiO$_2$, the clear, homogeneous elastomeric solution which had stable flow properties had a viscosity of 640 poises 20.6% ηi = 1.12. For results of exposure to light, see the following Table 3.

solved by heating with 450 parts of dimethylformamide to 50° C. for 8 hours to form a 25% elastomeric solution (76 poises).

(B) 1% by weight stabilizer as additive (comparison experiment)

1% by weight of the stabilizer, 4-bis-(β-hydroxyethyl)-amino-2,2,6,6-tetramethylpiperidine, were dissolved in solution A (additive).

(C) Incorporation of 1% by weight of stabilizer into the polyurethane 1.6 parts of 4-bis-(β-hydroxyethyl)-amino-2,2,6,6-tetramethylpiperidine, 9.95 parts of butane-1,4-diol, 200 parts of the isocyanate prepolymer solution and 13 parts of chlorobenzene were heated to 110° C. for 2 hours, until the swollen mass solidified. 450 parts of dimethylformamide were then added and the mixture was stirred for 8 hours at 50° C. to form an approximately 25% solution. A light-coloured, highly viscous elastomeric solution was obtained (1,000 poises).

Solutions A, B and C were cast to form foils which were tested by exposure in the fadeometer, some without further treatment, others after 1 hour's extraction with perchloroethylene at 50° C. and others after 1 hour's boiling in 1% acetic acid.

The films were exposed in the fadeometer and found to give the following reactions:

After 22 hours exposure in the fadeometer, foil (A) was a deep yellow (brown) colour and its strength had been to a large extent destroyed (comparison experiment without additive). Foil (B) containing 1% stabilizer in the form of additive was only slightly yellowish Table 3

| | | | Fadeometer exposure of polyurethane elastomer films and filaments | | | | | | | | |
|---|---|---|---|---|---|---|---|---|---|---|---|
| | | | Discoloration, tensile strenth (g/dtex) and elongation at break (%) after Fadeometer exposure | | | | | | | | |
| Example No. | Characterisation | After-treatment | Without exposure g/dtex % Elong. | | After 44 hours g/dtex % Elong. | | After 66 hours g/dtex % Elong. | | After 88 hours g/dtex % Elong. | | After 110 hours g/dtex % Elong. |
| 3A | Comparison experiment without incorporation of stabilizer | none | 0.60 colourless | 680 | 0.33 yellowish | 580 | <0.10 | yellow | ←No longer measurable→ | | |
| | | "Per" (see Table 1) | — | | 0.20 yellowish | 440 | | | ←No longer measurable → yellow | | |
| 3B | 0.6% stabilizer according to MP 3 | none | 0.50 colourless | 690 | 0.47 ← | 720 ← | 0.53 colourless | 715 | 0.51 → | 710 → | 0.50 → | 700 → |
| | | "Per" | 0.50 colourless | 690 | 0.52 ← | 690 ← | 0.50 colourless | 660 | 0.50 → | 675 → | 0.52 → | 670 → |
| 3C | 0.72% stabilizer according to MP 4 | none | 0.55 colourless | 690 | 0.53 ← | 690 ← | 0.48 colourless | 650 | 0.49 → | 650 → | 0.28 → | 605 → |
| | | "Per" | 0.55 colourless | 690 | 0.46 | 655 | 0.40 colourless → | 605 → | not measured | → | 0.38 → | 520 → |

Excellent, extraction resistant stabilization against discoloration and degradation is achieved by the incorporation of stabilizer according to the invention.

EXAMPLE 4

Isocyanate prepolymer formation 500 parts of a polyester of adipic acid, hexane-1.6-diol and neopentyl glycol having a molecular weight of 1955 (molar ratios of glycols 65:35). 192.2 parts of diphenylmethane-4,4'-diisocyanate and 173 parts of chlorobenzene were heated to 80° C. for 2 hours, until the isocyanate content of the solution was 4.895%.

(A) Chain lengthening with butanediol (comparison experiment)

10.49 parts of butane-1,4-diol, 17 parts of chlorobenzene and 200 parts of the isocyanate prepolymer were heated together at 110° C. for 2 hours. A polymer mass which swelled to a solid gel was obtained. It was disand its strength was less impaired. After the extraction treatments, however, the foils were yellow brown and degraded in the same way as foil (A) (stabilization not resistant to extraction). By contract, foil C according to the invention was almost colourless after 22 hours' exposure in the fadeometer and was equally stable after extraction. The incorporation of stabilizer in accordance with the invention resulted in foil which were well stabilized both against discoloration and against degradation of strength.

EXAMPLE 5

(a) Isocyanate prepolymer 400 parts of hexane-1.6-diol/2,2-dimethylpropane-1,3-diol (65/35)- adipic acid copolyester having a molecular weight of 1915, 7.92 parts of N-methyl-bis-(β-hydroxypropyl)amine, 112 parts of 4,4'-diphenylmethane-diisocyanate and 130 parts of dimethylformamide were heated to 50° C. for 50 minutes, until the isocyanate content was 2.865% (based on the solid substance).

(b) Chain lengthening with β-semicarbazido-propionic acid hydrazide (polyurethane without stabilizer)

11.8 parts of semicarbazido-propionic acid hydrazide were dissolved in 23.0 parts of water and 580 parts of dimethylformamide, and 268.75 parts of isocyanate prepolymer solution (a) were added. The clear, colourless elastomeric solution was pigmented with 4% $TiO_2$.

(c) Preparation of a stabilizer-polymer (-H)

42.6 parts of 4-(γ-aminopropyl)-amino-2,2,6,6-tetramethylpiperidine were introduced into the reaction vessel with 170 parts of dimethylformamide. 33.6 parts of hexane-1,6-diisocyanate in 130 parts of dimethylformamide were slowly added dropwise with stirring, and the mixture was heated after all the dimethylformamide had been added. The clear, 20% polymer solution was added in portions to polyurethane (b). ηi-value = 0.67.

(d) Preparation of a stabilizer-polymer (-T)

34.8 parts of tolylene-2,4-diisocyanate in 140 parts of dimethylformamide were added to 42.6 parts of 4-(β-aminopropyl)-amino-2,2,6,6-tetramethylpiperidine in 170 parts of dimethylformamide with stirring; the mixture was then stirred for a further 30 minutes. The homogeneous, clear solution obtained had a viscosity of about 35 poises/20%. ηi-value = 0.81.

(e) Preparation of a stabilizer-polymer (-D)

A solution of 50 parts of diphenylmethane-4,4'-diisocyanate in 200 parts of dimethylformamide was added dropwise with stirring to 42.6 parts of 4-(γ-aminopropyl)amino-2,2,6,6-tetramethylpiperidine in 170 parts of dimethylformamide. The polymer which precipitated was dissolved by heating to 60° C. ηi-value = 0.80

(f) Polyurethane mixtures containing stabilizer

Elastomeric solution (b) was mixed with stabilizer-polymer solutions c-e to form stabilized polyurethanes having the following solid contents of stabilizer-polymer (figures based on each case on percent by weight of solid substance).

| 1) | 0.55% by wt. polymer c) | (corresponds to 0.3% by wt of stabilizer in polyurethane mixture) |
|---|---|---|
| 2) | 1.8% by wt. polymer c) | ("1.0% by wt.) |
| 3) | 3.6% by wt. polymer c) | ("2.0% by wt.) |
| 4) | 2.0% by wt. polymer d) | ("1.1% by wt.) |
| 5) | 2.0% by wt. polymer e) | ("1.36% by wt.) |

The polyurethane mixtures were dried in the form of their solutions to form foils and cut up into fibres (cut staple fibres) and were in part spun by the wet spinning and the dry spinning process to form elastomeric filaments (results see the following Table 4).

Table 4

Fadeometer exposure of cut filaments (discoloration, tensile strength/elongation at break)

| Description of Sample | Without exposure TS (g/dtex) Elong. (%) (discoloration) | 22 Fade.hrs. TS Elong. | 44 Fade.hrs. TS Elong. | 66 Fade.hrs. TS Elong. | 88 Fade.hrs. TS Elong. | 132 Fade.hrs. TS Elong. |
|---|---|---|---|---|---|---|
| Polyurethane b without stabilisation (Comparison sample) | 0.61 / 676 (colourless) | 0.28 / 480 (yellowish) | 0.17 / 410 (yellow) | 0.09 / 230 (yellow) | — | — |
| Polyurethane mixtures: | | | | | | |
| Polyurethane f/1 (+0.55% polymer C) | — | 0.46 / 575 (almost colourless) | 0.37 / 550 (yellowish) | 0.17 / 340 (yellow) | 0.13 / 340 (yellow) | |
| Polyurethane f/2 (+1.8% polymer C) | — | 0.54 / 600 (colourless) | 0.47 / 565 (almost colourless) | 0.43 / 550 (almost colourless) | 0.42 / 535 (almost colourless) | 0.15 / 335 (yellowish) |
| Polyurethane f/3 +3.6% polymer C) | — | 0.65 / 630 (colourless) | 0.53 / 565 (colourless) | 0.49 / 565 (almost colourless) | 0.48 / 545 (almost colourless) | 0.30 / 435 (yellowish) |
| "boiled 1 hour in $CCl_4$ | — | 0.64 / 640 (colourless) | 0.62 / 630 (colourless) | 0.49 / 570 (colourless) | 0.47 / 558 (colourless) | 0.19 / 335 (yellowish) |
| "boiled 1 hour in 1% acetic acid | — | 0.60 / 615 (colourless) | 0.46 / 585 (almost colourless) | 0.44 / 590 (almost colourless) | 0.41 / 555 (almost colourless) | 0.26 / 435 (yellowish) |
| Polyurethane f/4 (+2% polymer d) | — | colourless | colourless | almost colourless | pale yellowish | yellow |
| "boiled 1 hour 1% acetic acid | — | colourless | colourless | almost colourless | pale yellowish | yellow |
| Polyurethane f/5 (+2% polymer e) | — | colourless | almost colourless | almost colourless | pale yellowish | yellow |
| "boiled 1 hour 1% acetic acid | — | colourless | almost colourless | almost colourless | pale yellowish | yellow |
| Copolyurethane (according to Example 6) 80/20 co-chain lengthening | 0.51 / 625 (colourless) | 0.52 / 600 (colourless) | 0.48 / 570 (almost colourless) | 0.40 / 540 (almost colourless) | 0.38 / 515 (almost colourless) | 0.35 / 500 (almost colourless) |
| "after | — | 0.49 / 570 | 0.48 / 560 | 0.42 / 520 | 0.42 / 510 | 0.31 / 465 |

Table 4-continued

| Description of Sample | Fadeometer exposure of cut filaments (discoloration, tensile strength/elongation at break) | | | | | |
|---|---|---|---|---|---|---|
| | Without exposure TS (g/dtex) Elong. (%) (discoloration) | 22 Fade.hrs. TS (g/dtex) Elong. (%) (discoloration) | 44 Fade.hrs. TS (g/dtex) Elong. (%) (discoloration) | 66 Fade.hrs. TS (g/dtex) Elong. (%) (discoloration) | 88 Fade.hrs. TS (g/dtex) Elong. (%) (discoloration) | 132 Fade.hrs. TS (g/dtex) Elong. (%) (discoloration) |
| 1 hours extraction with boiling CCl$_4$ | | (colourless) | (almost colourless) | (almost colourless) | (almost colourless) | (almost colourless) |

Elastomeric solution f/2 (1.8% by weight polymer (c) in the polyurethane), which had a viscosity of 640 poises/24%, was dry spun by the dry spinning process through a 16/0.2mm spinning die, drawn off at the rate of 100m/min and wound with 150%. The filament was after-treated for 1 hour at 130° C. and then examined: Tensile strength 0.67g/dtex; 553% elongation, modulus/300% 130 mg/dtex, permanent elongation 16%, heat distortion temperature 173° C. Abrasion resistant dyeings were obtained on the filaments with the red acid dye, C.I. 23 635. When low molecular weight stabilizers known in the art (for example, 1% Tinuvin-770) are added, they only provide abrasion resistant dyeings but lose their stabilizing effect when extracted with perchloro-ethylene or carbon tetrachloride. The filaments according to the invention prove to be resistant to extraction.

As the results on cut fibres show (see the following Table 4), a distinct stabilizing effect is obtained in the polyurethane mixtures, this effect increasing with the quantity added (f/1-f/3). The stabilization is resistant both to extraction with chlorinated hydrocarbons and to boiling with 1% acetic acid. Dyeings obtained with acid dyes are therefore also not found to be damaged by abrasion, as is normally the case when stabilizers according to the present state of the art are used (for example, Tinuvin 770).

EXAMPLE 6

Incorporation of a reactive stabilizer (1.37% by weight)

3.78 parts of β-semicarbazido-propionic acid hydrazide and 1.245 parts of 4-(γ-amino-propyl)-amino-2,2,6,6-tetramethylpiperidine were dissolved in 7 parts of water and diluted with 223 parts of dimethylformamide. 107 parts of the isocyanate prepolymer solution from Example 5 are stirred into this solution. The solution, which was initially somewhat inhomogeneous, became homogeneous and smooth with stirring. After pigmentation with 4% TiO$_2$ (based on the solid substance), the solution was dried to form films which were cut up into fibres and exposed to light in this form. The fibres were still colourless even after 123 hours exposure in the fadeometer, and still had more than ⅔ of their initial strength after that time. Even 1 hour's extraction in boiling carbon tetrachloride left the stabilization virtually unchanged. Dyeing with acid dyes (for example, 2% Acid Red No. 114) produced stable, abrasion resistant dyeings. Portions of the solutions were spun by the wet spinning process. The filaments obtained were well stabilized and the stabilization was resistant to extraction. Very fast dyeings are obtained when the filaments were dyed with acid dyes (see Table 4).

Comparison experiment: When the same quantity (1.37% by weight) of stabilizer was dissolved as additive in the elastomeric solution of Example 5b and the solution was then cast to form films in the same manner and the films were exposed in the fadeometer, the stabilizer introduced as additive provided approximately the same resistance to discoloration as the incorporation of stabilizer according to the invention. If, however, the foils containing the additives are extracted with solvent (for example, 1 hour in boiling CCl$_4$) the loss of stabilizer by extraction becomes obvious when the foils are subsequently exposed in the fadeometer; discoloration of the films sets in almost as rapidly as in the substance not containing stabilizer.

EXAMPLE 7

(a) Preparation of a stabilizer-containing additive which has tertiary amine groups 20 parts of a polytetramethylene ether having a molecular weight of 1,000, 40 parts of N,N'-bis-(β-hydroxyethyl)-piperazine, and 40 parts of bis-(β-hydroxyethyl)-4-amino-2,2,6,6-tetramethylpiperidine were introduced into 576 parts of dimethylacetamide and heated with 91.87 parts of isophorone diisocyanate at 70° to 90° C. for about 2 hours, until all the isocyanate groups had reacted and a viscous elastomer solution had been obtained (25% solid content).

(b) Preparation of a stabilizer-free elastomer solution 200 parts of a polytetramethylene ether (mol weight 2,000), 50 parts of diphenylmethane-4,4'-diisocyanate and 62.5 parts of dimethylacetamide were reacted together at 40° C. to 50° C. for 60 minutes, until the isocyanate content was 3.30% (based on solid substance). 25 parts of solid carbon dioxide were added to a solution of 15.17 parts of hydrazide hydrate in 788 parts of dimethylacetamide for carbamate formation, and the solution was mixed with the isocyanate prepolymer solution with vigorous stirring. A highly viscous elastomer solution was obtained. This solution was pigmented with 4% TiO$_2$.

(c) Preparation of a mixture of an unstabilized polyurethane and a polyurethane containing stabilizer 531 parts of the unstabilized polyurethane solution (b) were mixed with 21.8 parts of the stabilizer-containing polyurethane solution (a). The polyurethane mixture contained approximately 0.8% of built-in stabilizer and approximately 100 mval of tertiary amino groups (from bis-hydroxyethylpiperazine).

Parts of the solution are dried to form foils and cut up into fibres.

Whereas fibres of substance (b) took up virtually no acid dye (2% Acid Red 114, C.I. 23 635), very good and abrasion resistant dyeings could be obtained with this dye on fibres of substance (c).

After 66 hours' exposure in the fadeometer, fibres of substance (b) turned yellow and had virtually no tensile strength whereas fibres of substance (c) were still colourless after this treatment, and still had more than 92% of the tensile strength found before exposure.

EXAMPLE 8

(a) Isocyanate prepolymer formation 400 parts of a polytetramethylene ether diol having a molecular weight of 1045 were reacted with 33.3 parts of tolylene diisocyanate and 50 parts of dimethyl formamide at 40° C. for 30 minutes and thereafter reacted with 95.6 parts of diphenylmethane diisocyanate in 85 parts of dimethylformamide at 45° C. for 50 minutes to produce an isocyanate prepolymer having an isocyanate content of 2.94% (based on the solid substance).

(b) Chain lengthening with hydrazine hydrate (comparison experiment)

6.02 parts of hydrazine hydrate were dissolved in 898 parts of dimethylformamide. The solution was transferred, together with 20 parts of carbon dioxide snow, into a suspension of hydrazinocarboxylic acid, and 420 parts of isocyanate prepolymer solution (a) were added thereto with stirring. $CO_2$ was liberated and a highly viscous elastomeric solution was obtained within a few minutes. After pigmentation with 4% $TiO_2$ and the stirring in of 0.100 parts of a 1:1 mixture of hexanediisocyanate and Desmodur N (a) biuret triisocyanate of hexanediisocyanate) the viscosity of this elastomeric solution rose to 510 poises.

(c) Co-chain lengthening with 10 mol% stabilizer 5.42 parts of hydrazine hydrate and 2.38 parts of stabilizer prepared according to method of preparation (1) were dissolved in 890 parts of dimethylformamide. 20 parts of carbon dioxide snow were added, followed by 420 parts of the isocyanate prepolymer solution and 0.1 parts of the di/triisocyanate mixture of (b). After pigmentation (4% $TiO_2$), a highly viscous elastomer solution was obtained.

Elastomer films b/c were exposed in the fadeometer for up to 154 hours. Whereas foil (b) was yellow after only 22 hours and yellow-brown after 44 hours and its tensile strength had been completely destroyed, foils (B) were still colourless after 110 hours in the fadeometer, and their tensile strength was still maintained after this treatment, even if they had previously been boiled for 1 hour with 1% acetic acid solution or for 1 hour with carbon tetrachloride.

EXAMPLE 9

(a) Isocyanate prepolymer 100 parts of polytetramethylene ether diol (molecular weight 2,000), 18.9 parts of bis-(β-hydroxypropyl)-methylamine, 246.1 parts of diphenylmethane-4,4'-diisocyanate and 317 parts of dimethylformamide were heated to 40° C. for 35 minutes, until the isocyanate content was 2.355% (based on the solid substance).

(b) Chain lengthening with ethylenediamine (comparison experiment)

2.90 parts of ethylenediamine were dissolved in 539 parts of dimethylformamide and converted into the carbamate suspension with 5 parts of solid carbon dioxide. 215 parts of prepolymer a) were added with vigorous stirring. After pigmentation (4% rutile), the solution viscosity was 200 poises, the ηi value 1.00.

(c) Incorporation of 0.57 percent by weight of 1,2,2,6,6-pentamethyl-4-(γ-aminopropyl)-piperidine 1.375 parts of ethylene diamine and 0.505 parts of 1,2,2,6,6-pentamethyl-4-(γ-aminopropyl)-amine were dissolved in 270 parts of dimethylformamide. 5 parts of solid carbon dioxide were added, followed by 107.5 parts of isocyanate prepolymer a). After pigmentation with 4% $TiO_2$, the solution viscosity (ηi-value 0.90) was 107 poises. After reaction with a further quantity of prepolymer up to the equivalence of the $NH_2$ and NCO groups the viscosity rose to 229 poises (ηi value 1.01).

(d) Chain lengthening with β-semicarbazido-propionic acid hydrazide (comparison experiment)

7.47 parts of β-semicarbazido-propionic acid hydrazide were dissolved in 15 parts of water and 541 parts of dimethylformamide, and 215 parts of isocyanate prepolymer solution (a) were then added (isocyanate content 2.265, based on solid content). After pigmentation with 4% rutile, the solution viscosity was 600 poises (ηi value 1.01).

(e) Incorporation of 1.114% by weight of 1,2,2,6,6-pentamethyl-4-(γ-aminopropyl)-aminopiperidine 1.05 parts of 1,2,2,6,6-pentamethyl-4-(γ-aminopropyl)-aminopiperidine and 3.374 parts of β-semicarbazido-propionic acid hydrazide were dissolved in 7 parts of water and 270 parts of dimethylformamide. After the addition of 4% rutile, 107.5 parts of the isocyanate prepolymer solution (2.265% NCO) were stirred in. The viscosity of the homogeneous elastomeric solution was 185 poises (ηi-value 0.823). The solution was resistant to conversion into a paste.

To 80 parts of this solution there was added 0.04 parts of hexane-1,6-diisocyanate until the $NH_2$/NCO equivalence point was reached. This addition was accompanied by a rise in the solution viscosity to 380 poises (ηi-value 0.98).

The elastomeric solutions were tested in the form of films, cut fibres and wet spun filaments to determine their resistance to UV light and NO gases. Cut fibres without stabilizers (9b and 9d) were deep yellow and their tensile strength completely destroyed after only 22 fadeometer hours. Fibres obtained according to (c) and (e) manifested excellent stabilisation. After 110 hours they were still colourless and their strength virtually intact, they were still highly stretchable without breakage, they showed resistance to fatigue when subjected to alternate elongations, and in the nitric oxide test according to DIN 54025 they showed excellent resistance to discoloration. The three-fold treatment was therefore increased to a six-fold treatment to demonstrate that excellent resistance was still obtained even then. The films were almost colourless and their strength well preserved even after 154 hours in the fadeometer test. Field exposure to 557 hours of sunlight (natural light) also produced no discoloration in the filaments or fibres.

EXAMPLE 10

(A) Preparation of a stabilizer-containing polyurethane 400 parts of a copolyester according to Example 5 having a molecular weight of 1685, 79.8 parts of hexane-1,6-diisocyanate and 120 parts of chlorobenzene were heated to 95° C. for 160 minutes, until the iscocyanate content was 4.02% (based on solid substance). 200 parts of this prepolymer solution were introduced into a solution of 20.8 parts of 4-bis-(γ-aminopropyl)-amino-2,2,6,6-tetramethylpiperidine in 340 parts of dimethylformamide, a highly viscous polyurethane solution being obtained.

(B) Mixture of polyurethanes

The elastomeric solution from Example 5b and the stabiliserpolyurethane solution 10A were mixed in such proportions that the proportion of 4-bis-(γ-aminopropyl)-amino-2,2,6,6-tetramethylpiperidine in the quantity of solid substance of the mixture is 0.5% by weight (approx. 4.3% by weight of 10A). When the polyurethane mixture was tested in the form of a foil, exposure in the fadeometer showed evidence of good, extraction-resistant stabilization. Up to 66 fadeometer hours, the foil was found to be colourless or almost colourless, even when it had first been extracted with perchloroethylene (60 minutes/50° C.).

We claim:

1. Permanently stabilized polyurethanes containing polymer segments represented by the following formula:

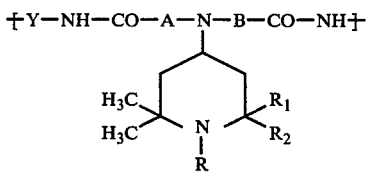

wherein

Y represents the group derived from a diisocyanate or from an diisocyanat prepolymer, R represents hydrogen, a straight chain or branched chain alkyl group having 1 to 20 C atoms, an alkenyl group having 3 to 5 C atoms, an aralkyl group having 7 to 12 C atoms, the group —$CH_2$—CH-$R_5$—OH wherein $R_6$ denotes hydrogen, methyl or phenyl; the group —$CH_2$—$CH_2$—CN, the group —$CH_2$—$CH_2$-COOalkyl or the group

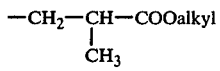

$R_1$ and $R_2$ may be identical or different and may each represent a straight chain or branched chain alkyl group having 1 to 6 C atoms or, together with the ring carbon atom to which they are attached, they may represent a cycloalkyl ring having 5 to 7 C atoms.

A may represent a direct bond, an ω-hydroxyalkyl, an ω-aminoalkyl, an ω-carboxylic acid hydrazido-, an ω-semicarbazido or an ω-carbazic ester group, in each case without the hydrogen atom in the end position.

B represents an ω-hydroxyalkyl-, an ω-aminoalkyl-, an ω-carboxylic acid hydrazido- or an ω-semicarbazido group, in each case without the hydrogen atom in the end position, the quantity of these segments in the polyurethanes being selected so that the proportion of the stabilizers represented by the following formula

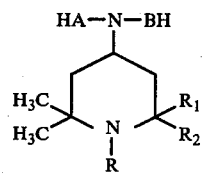

is from 0.05 to 5% by weight in the polyurethane.

2. Permanently stabilized polyurethanes containing polymer segments of 2,2,6,6-tetraalkylpiperidine derivatives represented by the following formula:

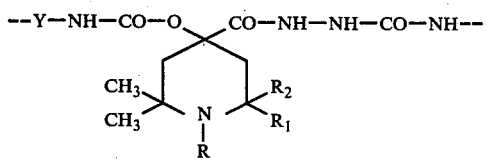

wherein R, $R_1$ and $R_2$ have the meaning indicated in claim 1, the quantity of these segments in the polyurethanes being chosen so that the proportion of stabilizers represented by the following formula:

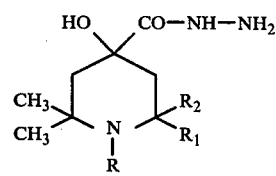

is 0.05 to 5% by weight in the polyurethane.

3. A process for the production of polyurethanes wherein the derivatives of 2,2,6,6-tetraalkylpiperidine having two H-active reactive groups used are derivatives represented by formula I:

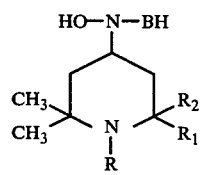

wherein R, $R_1$ and $R_2$, A and B have the meaning indicated in claim 1.

4. The process for the production of polyurethanes wherein as derivatives of 2,2,6,6-tetraalkylpiperidines having two H-active reactive groups there are used derivatives represented by the following formula II;

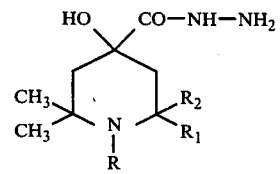

wherein R, $R_1$ and $R_2$ have the meaning indicated in claim 1.

* * * * *